(12) United States Patent
Laine et al.

(10) Patent No.: US 10,641,859 B2
(45) Date of Patent: May 5, 2020

(54) SLICED LENS STAR TRACKER

(71) Applicant: The Charles Stark Draper Laboratory, Inc., Cambridge, MA (US)

(72) Inventors: Juha-Pekka J. Laine, Boston, MA (US); Robin Mark Adrian Dawson, Watertown, MA (US); Daniel M. Meiser, Providence, RI (US); Benjamin F. Lane, Sherborn, MA (US); Eric T. Hoke, Somerville, MA (US); Matthew T. Jamula, Brighton, MA (US); Stephen P. Smith, Acton, MA (US); Matthew A. Sinclair, Stoneham, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 155 days.

(21) Appl. No.: 15/661,881

(22) Filed: Jul. 27, 2017

(65) Prior Publication Data
US 2019/0033421 A1 Jan. 31, 2019

(51) Int. Cl.
*G01S 3/786* (2006.01)
*H04N 7/18* (2006.01)
(Continued)

(52) U.S. Cl.
CPC ............ *G01S 3/7867* (2013.01); *G01S 3/781* (2013.01); *G02B 3/06* (2013.01); *G02B 13/0015* (2013.01); *H04N 7/181* (2013.01); *G01C 21/025* (2013.01)

(58) Field of Classification Search
None
See application file for complete search history.

(56) References Cited

U.S. PATENT DOCUMENTS

| 3,658,427 A | 4/1972 | DeCou |
| 5,093,574 A * | 3/1992 | Pratt .................. G01S 3/781 |
| | | 250/339.02 |

(Continued)

FOREIGN PATENT DOCUMENTS

| GB | 2 258 576 | 2/1993 |
| JP | 2006287948 | * 10/2006 |

OTHER PUBLICATIONS

National Aeronautics and Space Administration, "Low Cost Star Tracker Software," https://www.nasa.gov/ames-partnerships/robotics-automation-and-control/lowcoststartracker, 2 pages, dated Jul. 27, 2016.

(Continued)

*Primary Examiner* — Frederick D Bailey
(74) *Attorney, Agent, or Firm* — Sunstein LLP

(57) ABSTRACT

A star tracker includes a lens slice, a pixelated image sensor, an ephemeral database and a processor configured to estimate attitude, orientation and/or location of the star tracker based on an image of one or more celestial objects projected by the lens slice onto the pixelated image sensor. The lens slice is smaller and lighter than an optically comparable conventional lens, thereby making the star tracker less voluminous and less massive than conventional star trackers. A lens slice is elongated along one axis. Optical performance along the elongation axis is comparable to that of a conventional circular lens of equal diameter. Although optical performance along a width axis, perpendicular to the elongation axis, of a lens slice can be significantly worse than that of a conventional lens, use of two orthogonal lens slices provides adequate optical performance in both axes, and still saves volume and mass over a conventional lens.

21 Claims, 12 Drawing Sheets

(51) Int. Cl.
    *G02B 13/00* (2006.01)
    *G02B 3/06* (2006.01)
    *G01S 3/781* (2006.01)
    *G01C 21/02* (2006.01)

(56) References Cited

U.S. PATENT DOCUMENTS

| | | | |
|---|---|---|---|
| 5,189,294 A | 2/1993 | Jackson et al. | |
| 9,544,488 B2 | 1/2017 | Dawson et al. | |
| 2009/0141942 A1* | 6/2009 | Rasmussen | G01C 3/08 382/106 |
| 2010/0027086 A1* | 2/2010 | Sato | G02B 26/08 359/22 |
| 2010/0230577 A1 | 9/2010 | Ma et al. | |
| 2012/0162753 A1* | 6/2012 | Tatsuno | G02B 17/08 359/364 |
| 2014/0267696 A1* | 9/2014 | Yeh | G01C 21/20 348/135 |
| 2015/0124103 A1 | 5/2015 | Dawson et al. | |
| 2016/0041265 A1* | 2/2016 | Waldron | G01C 3/085 250/203.6 |
| 2017/0146222 A1* | 5/2017 | Hsu | F21V 17/02 |

OTHER PUBLICATIONS

Terentiev, et al., "Designing of Optical System with Cylindrical Lenses of Ignition Center Coordinates Pyrometric Sensor," XI International Conference and Seminar EDM'2010, Section V, 4 pages, Jun. 20-Jul. 4.

European Patent Office as the International Searching Authority, Authorized Officer: Ester Camps, International Search Report and Written Opinion of the International Searching Authority, PCT/US2018/039480, dated Oct. 15, 2018, 18 pages.

Wiedermann, et al., "The Sentinel-2 Satellite Attitude Control System Challenges and Solutions," 9th International ESA Conference on Guidance, Navigation & Control Systems, Porto, Portugal, 28 pages, Jun. 2, 2014.

\* cited by examiner

SLICED LENS STAR TRACKER

TECHNICAL FIELD

The present invention relates to optics and, more particularly, to lens slices used in star trackers.

BACKGROUND ART

Most artificial satellites, spacecraft and other craft, such as aircraft, ships and ground vehicles (collectively referred to herein as vehicles), require information about their locations and/or attitudes to accomplish their missions. This information may be obtained from one or more sources, such as ground-based radar tracking stations or on-board global positioning system (GPS) receivers, inertial guidance systems (INS) and/or star trackers.

A star tracker is an optical device that measures angles to one or more stars or other sufficiently bright celestial objects with known ephemerides, as viewed from a vehicle. A star tracker typically includes a catalog that lists bright navigational objects and information about their locations in the sky, sufficient to calculate a location of a vehicle in space, given bearings to one or more of the objects. A conventional star tracker includes a lens that projects an image of a celestial object onto a photocell, or that projects an image of one or more celestial objects onto a pixelated light-sensitive sensor array. The lens typically constitutes a large fraction of the volume and the mass of a star tracker. An ideal star tracker would be mechanically and optically simple, small and low in mass.

SUMMARY OF EMBODIMENTS

An embodiment of the present invention provides a star tracker. The star tracker has a field of view. The star tracker includes a database that stores ephemeral data about a plurality of celestial objects. The star tracker includes a pixelated image sensor and a lens slice disposed between the field of view and the pixelated image sensor. A processor is coupled to the pixelated image sensor and to the database. The processor is configured to automatically estimate an attitude of the star tracker, an orientation of the star tracker and/or a location of the star tracker. The processor is configured to base the estimate on: (a) data from the pixelated image sensor generated as a result of an image of at least one celestial object in the field of view being projected onto the pixelated image sensor by the lens slice and (b) data in the database.

The lens slice may define a surface. Light that forms the image of the at least one celestial object in the field of view may pass through the surface. The surface may be a simple curvature surface or a compound curvature surface.

The lens slice may include a first lens slice and a second lens slice. The first lens slice may have a first optical axis and a first longitudinal axis. The second lens slice may have a second optical axis and a second longitudinal axis. The first optical axis may be spaced apart from the second optical axis, and the first longitudinal axis may be perpendicular to the second longitudinal axis.

The first lens slice may include a first cylindrical lens, and the second lens slice may include a second cylindrical lens.

The first lens slice may define a first surface. At least some light that forms the image of the at least one celestial object in the field of view may pass through the first surface. The first surface may be a first simple curvature surface. The second lens slice may define a second surface. At least some light that forms the image of the at least one celestial object in the field of view may pass through the second surface. The second surface may be a second simple curvature surface.

The first lens slice may define a first surface. At least some light that forms the image of the at least one celestial object in the field of view may pass through the first surface. The first surface may be a first compound curvature surface. The second lens slice may define a second surface. At least some light that forms the image of the at least one celestial object in the field of view may pass through the second surface. The second surface may be a second compound curvature surface.

The first lens slice may be elongated along the first longitudinal axis, and the second lens slice may be elongated along the second longitudinal axis.

The first lens slice may have a first focal distance, and the second lens slice may have a second focal distance. The pixelated image sensor may include a first pixelated image sensor array and a second pixelated image sensor array. The first pixelated image sensor array may be disposed the first focal distance from the center of the first lens slice. The second pixelated image sensor array may be disposed the second focal distance from the center of the second lens slice.

The processor may be disposed in a volume. The volume may be bounded on a first side by a first imaginary plane that intersects one end of the first lens slice and extends perpendicular to the pixelated image sensor. The volume may be bounded on a second side by a second imaginary plane that intersects the other end of the first lens slice and extends perpendicular to the pixelated image sensor. The volume may be bounded on a third side by a third imaginary plane that intersects one end of the second lens slice and extends perpendicular to the pixelated image sensor. The volume may be bounded on a fourth side by a fourth imaginary plane that intersects the other end of the second lens slice and extends perpendicular to the pixelated image sensor.

The lens slice may include a cross-shaped spherical lens slice.

The lens slice may include a cross-shaped monocentric lens slice.

The lens slice may have a focal length. The pixelated image sensor may include a plurality of image sensor arrays. Each image sensor array of the plurality of image sensor arrays may be disposed the focal length from the center of the monocentric lens slice.

Another embodiment of the present invention provides a navigation system. The navigation system includes a database storing ephemeral data about a plurality of celestial objects. The navigation system also includes first, second and third star cameras. Each star camera of the first, second and third star cameras has a respective field of view. Each star camera of the first, second and third star cameras includes a respective pixelated image sensor and a respective lens slice disposed between the respective field of view and the respective pixelated image sensor. The navigation system also includes a processor coupled to the pixelated image sensor of each of the first, second and third star cameras and to the database. The processor is configured to automatically estimate an attitude of the navigation system, an orientation of the navigation system and/or a location of the navigation system. The processor is configured to base the estimate on: (a) data from the respective pixelated image sensors of the first, second and third star cameras generated as a result of an image of at least one celestial object in the field of view of at least one of the first, second and third star cameras being projected onto the respective pixelated image sensor by the respective lens slice and (b) data in the database.

Each star camera of the first, second and third star cameras may have a respective optical axis. The optical axes of the first, second and third star cameras may be mutually orthogonal.

For each star camera of the first, second and third star cameras, the respective lens slice may include a respective first lens slice and a respective second lens slice. The respective first lens slice may have a respective first optical axis and a respective first longitudinal axis. The respective second lens slice may have a respective second optical axis and a respective second longitudinal axis. The respective first optical axis may be spaced apart from the respective second optical axis. The respective first longitudinal axis may be perpendicular to the respective second longitudinal axis.

For each star camera of the first, second and third star cameras, the respective first lens slice may be elongated along the respective first longitudinal axis, and the respective second lens slice may be elongated along the respective second longitudinal axis.

The processor may be configured to provide separate estimates of the attitude of the navigation system, the orientation of the navigation system and/or the location of the navigation system, for each of the first, second and third star cameras. The navigation system may also include a navigation filter. The navigation filter may be configured to estimate an improved attitude of the navigation system, an improved orientation of the navigation system and/or an improved location of the navigation system. The navigation filter may base the improved estimate on the separate estimates of the attitude of the navigation system, orientation of the navigation system and/or location of the navigation system.

BRIEF DESCRIPTION OF THE SEVERAL VIEWS OF THE DRAWING

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, a star tracker having a sliced lens is disclosed, as well as methods for making lens slices. Several shapes of lens slices are disclosed, including a wide-angle cross-shaped monocentric lens slice. A lens slice is smaller and lighter than an optically comparable conventional circular lens, thereby making the star tracker less voluminous and less massive than conventional star trackers. A lens slice is elongated along one axis. Optical performance along the elongation axis is comparable to that of a conventional circular lens of equal diameter. Although optical performance along a width axis, perpendicular to the elongation axis, of a lens slice can be worse than that of a conventional lens, use of two orthogonal lens slices provides adequate optical performance in both axes, and still saves volume and mass over a conventional comparable circular lens.

Lenses

Figure 1:
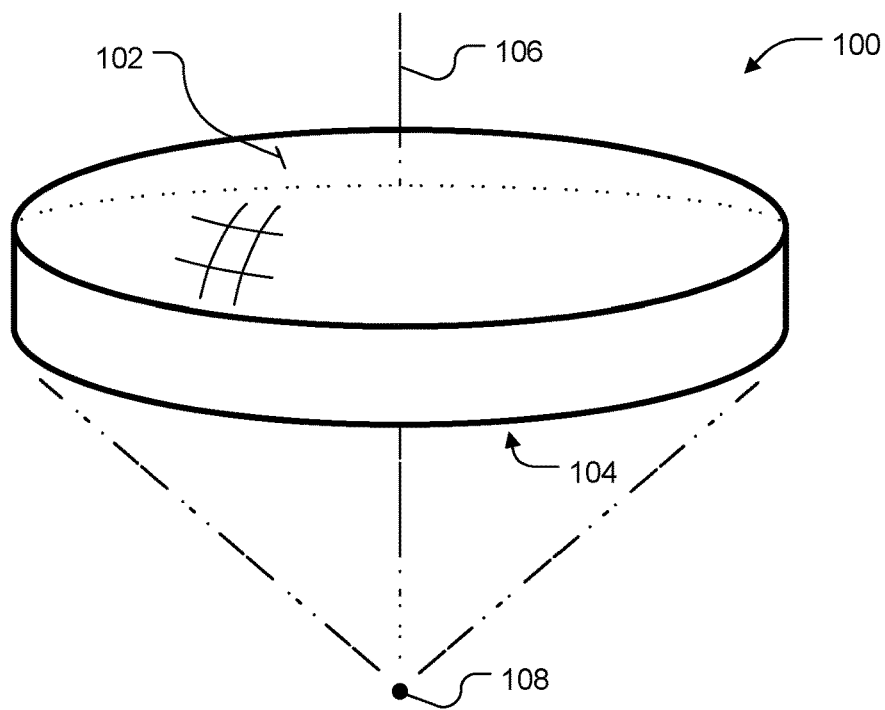
FIGS. 1 and 2 are respective perspective and top schematic illustrations of a convex circular lens, according to the prior art.
Figure 2:
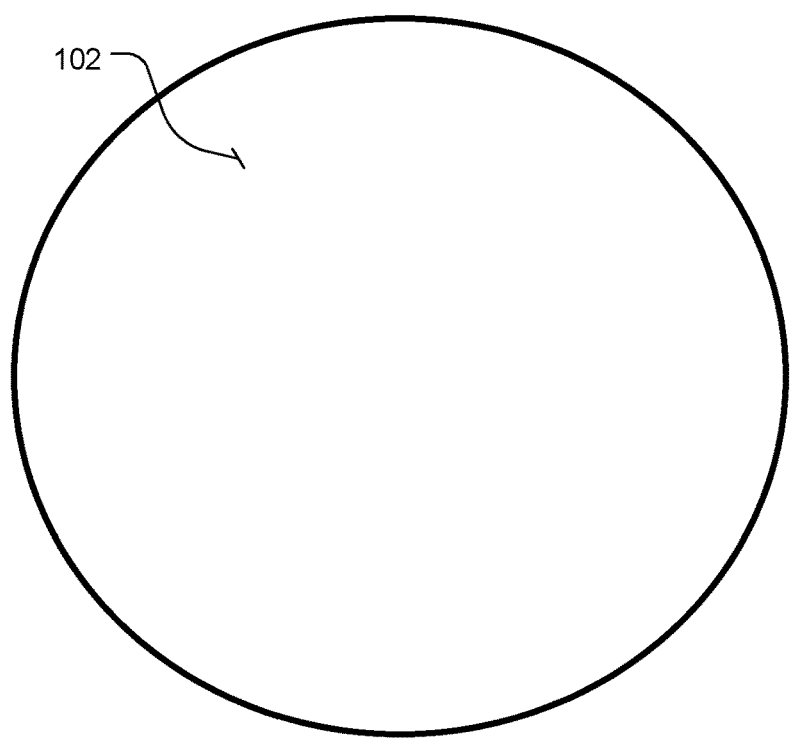

A lens is a transmissive optical device that focuses or disperses a light beam by means of refraction. An example of a simple conventional lens 100 is shown in perspective in FIG. 1 and in top view in FIG. 2. The simple lens 100 includes a single piece of transparent material, whereas a compound lens (not shown) includes several adjacent or spaced apart simple lenses (elements), usually arranged along a common axis, and sometimes cemented together. Unless otherwise indicated, as used herein, including in the claims, the term lens includes simple and compound lenses.

Lenses are made from materials that are transparent, at wavelengths of interest, such as glass or plastic. Lenses are typically molded to (at least approximate) desired shapes and sometimes ground and/or polished.

The degree to which a lens, mirror, or other optical system converges or diverges light is referred to as the optical system's optical power. Converging lenses have positive optical powers, while diverging lenses have negative optical powers. An optical system that neither converges nor diverges light has a power of 0. As used herein, including in the claims, a powered optical system or element is one that has a power greater than 0 or less than 0. An optical system or element that has a power of 0 is not powered and is not, therefore, considered herein to be a lens.

Returning to FIG. 1, the lens 100 has two light-transmitting surfaces ("faces"), as exemplified by surfaces 102 and 104. One or both of the faces can be convex or concave, and one of the faces may be flat. For example, face 102 of the lens 100 is convex. Both faces need not, however, have the same sense of curvature (concave or convex), and the two faces need not be symmetrically curved with respect to each other. In some lenses (not shown), one face is planar. In top view, as in FIG. 2, most lens faces are circular in shape. As used herein, including in the claims, a top view of a lens is a view along the optical axis 106 of the lens, looking at a light-transmission face of the lens.

Most lenses are spherical lenses, i.e., the two faces are parts of respective spherical surfaces. A line joining the centers of the spheres making up the lens faces is called an optical axis of the lens. Typically, the lens axis passes through the physical center of a lens, because of the way the lens is manufactured. An aspheric lens is a lens with at least one face profile that is not a portion of a sphere or cylinder. A spherical or aspherical lens focuses light into a point, exemplified by point 108, at least in ideal cases. A lens may focus different wavelengths of light at different locations. However, for simplicity of explanation, wavelength-induced differences in focal lengths are ignored.

Figure 3:
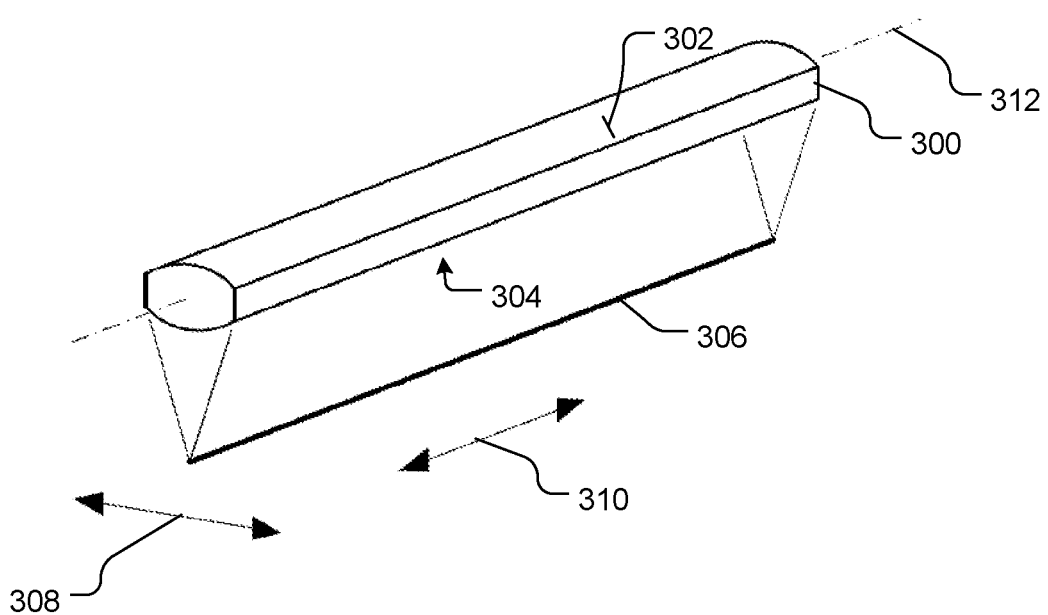
FIG. 3 is a perspective schematic illustration of a convex cylindrical lens, according to the prior art.

A cylindrical lens, an example of which is shown at 300 in FIG. 3, is a lens that focuses light into a line instead of a point, as contrasted with a spherical or aspherical lens. The curved face or faces, exemplified by faces 302 and 304, of a cylindrical lens are sections of respective cylinders, and they focus an image passing through the cylindrical lens into a line, exemplified by line 306, parallel to the intersection of a face 302 or 304 of the lens 300 and a plane tangent to the face 302 or 304. A cylindrical lens 300 therefore compresses a projected image in a direction 308 perpendicular to this line 306, but the lens leaves the image unaltered in a direction 310 parallel to the line 306. A cylindrical lens 300 has a longitudinal axis 312 extending through the cross-section of the lens and parallel to a direction 310 in which the lens is elongated. As used herein, including in the claims, the term longitudinal axis means an axis extending in a direction that corresponds to a largest dimension of an object.

A developable surface is a surface with zero Gaussian curvature, i.e., a surface that can be flattened onto a plane without distortion (stretching or compressing). Conversely, a developable surface can be made by transforming a plane, i.e., by folding, bending, rolling, cutting and/or gluing the plane. Thus, a cylindrical lens surface 302 or 304 is a developable surface, because the cylindrical lens surface can be formed by rolling a plane. A developable surface is also referred to as a simple curvature surface or a simple curve surface.

A non-developable surface, also referred to as a compound curvature surface or a compound curve surface, is a surface with non-zero Gaussian curvature. For example, a sphere is a non-developable surface. Thus, a spherical or aspherical lens face 102 or 104 (FIG. 1) is a compound curvature surface, whereas a cylindrical lens face is not a compound curvature surface.

Acylindrical lenses are cylindrical counterparts to aspherical lenses, i.e., elongated lenses with developable surfaces that are not portions of cylinders. Acylindrical lenses are designed to combine aberration-reducing benefits of an aspheric surface with one-dimensional focusing of standard cylindrical lenses. For simplicity, as used herein, including in the claims, the term cylindrical lens includes cylindrical and acylindrical lenses, and the term spherical lens includes spherical and aspherical lenses. Suitable cylindrical, acylindrical, spherical and aspherical lenses are readily available, such as from Thorlabs Inc., Newton, N.J.

Lens Slice

Disclosed is a novel lens, referred herein to as a lens slice. One exemplary embodiment of a lens slice 400 and its optical axis 402 are shown in perspective in FIG. 4 and in top view in FIG. 5. A lens slice is a transmissive optical device that focuses or disperses a light beam by means of refraction. A lens slice has at least one curved (cylindrical, acylindrical, spherical or aspherical) surface (face), exemplified by faces 404 and 406, through which the light beam passes. Thus, a lens slice is a powered optical element, like conventional lenses. However, a lens slice includes at least one elongated (in top view) portion. Each elongated portion has a respective elongation axis, exemplified by elongation axis 408, which is perpendicular to an optical axis 402 of the lens slice. Conceptually, as shown schematically in FIG. 6, some embodiments of a lens slice may be thought of as a diametric portion 400 sliced from a conventional spherical or aspherical lens 600. Optical performance along the elongation axis 408 of a lens slice 400 is comparable to that of a conventional lens, such as lens 600, of equal diameter 410. However, optical performance along a width axis 412 (perpendicular to the elongation axis) of a lens slice 400 can be significantly worse than that of a conventional lens. Aspects of a lens slice may be, but are not necessarily, rotationally symmetric about the optical axis 402. Some embodiments of lens slices 400 have fields of view on the order of about 30°.

In other embodiments, a lens slice is, or includes, a cylindrical or acylindrical lens. Thus, as used herein, including in the claims, the term lens slice includes cylindrical and acylindrical lenses.

Figure 5:
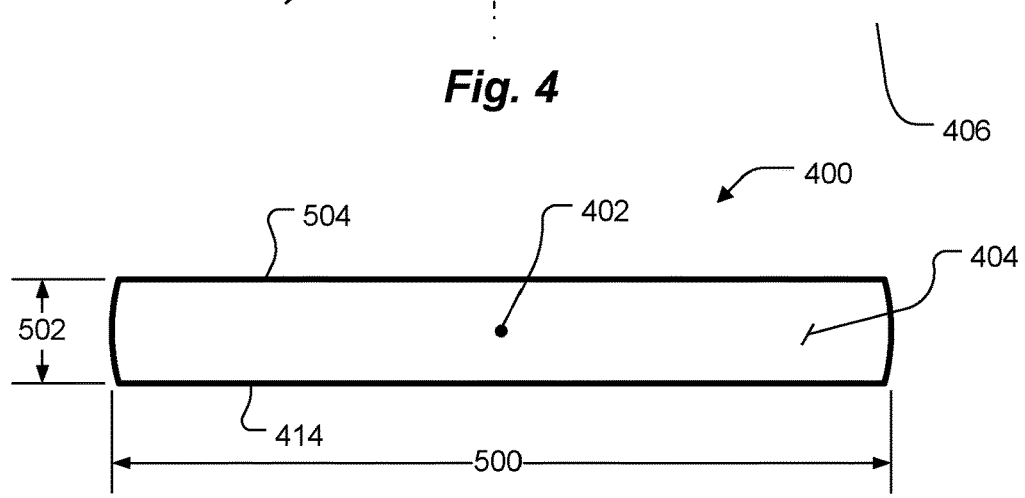
Figure 6:
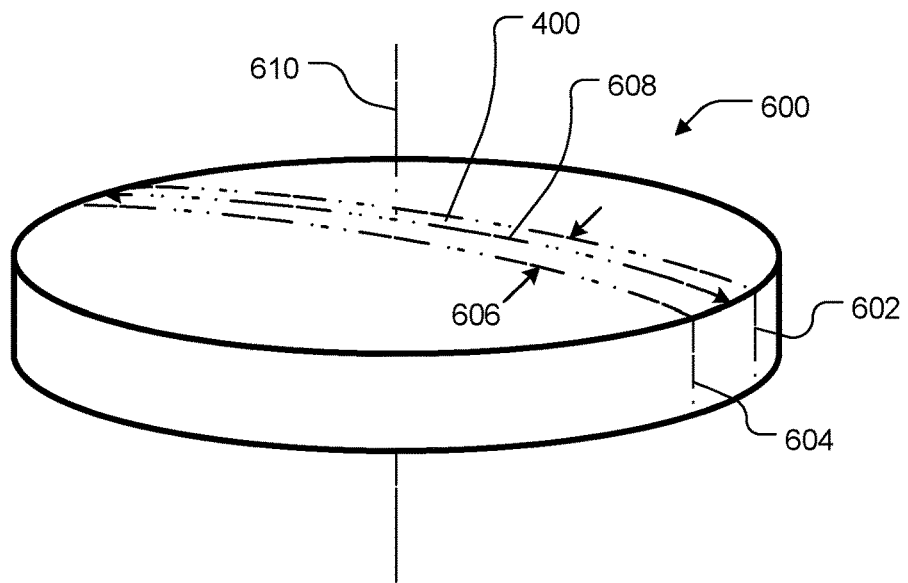
FIG. 6 is a perspective conceptual schematic illustration of formation of the lens slice of FIGS. 4 and 5, according to an embodiment of the present invention.

A conceptual conventional spherical or aspherical lens 600, from which the lens slice 400 may be thought of as being sliced, is shown in FIG. 6. In FIG. 6, the lens slice 400 is indicated by dashed lines 602 and 604. Thus, the lens slice 400 includes only a portion 606 of the conceptual lens 600. Whereas conventional spherical and aspherical lenses 100 (FIG. 2) are generally circular, in top view, a lens slice 400 (FIGS. 4-6), according to this embodiment, can be described as an elongated diametric slice of a spherical or aspherical lens, i.e., a slice that extends across a diameter, indicated by dashed line 608 (FIG. 6), i.e., from edge to edge, of the conceptual conventional lens 600 from which it is sliced and that includes all portions of the conceptual lens through which the optical axis 610 extends. Elongated herein means the light admitting surface (face) 404 (FIG. 5), as seen in top view, is longer along one dimension 500 than along an orthogonal dimension 502, where both dimensions 500 and 502 are perpendicular to the optical axis 402. Length of the lens slice 400 refers to the longer dimension 500, and width of the lens slice 400 refers to the shorter dimension 502. According to some embodiments, a lens slice has a length-to-width ratio of at least about 3:1, 5:1, 8:1 or 10:1.

Figure 7:
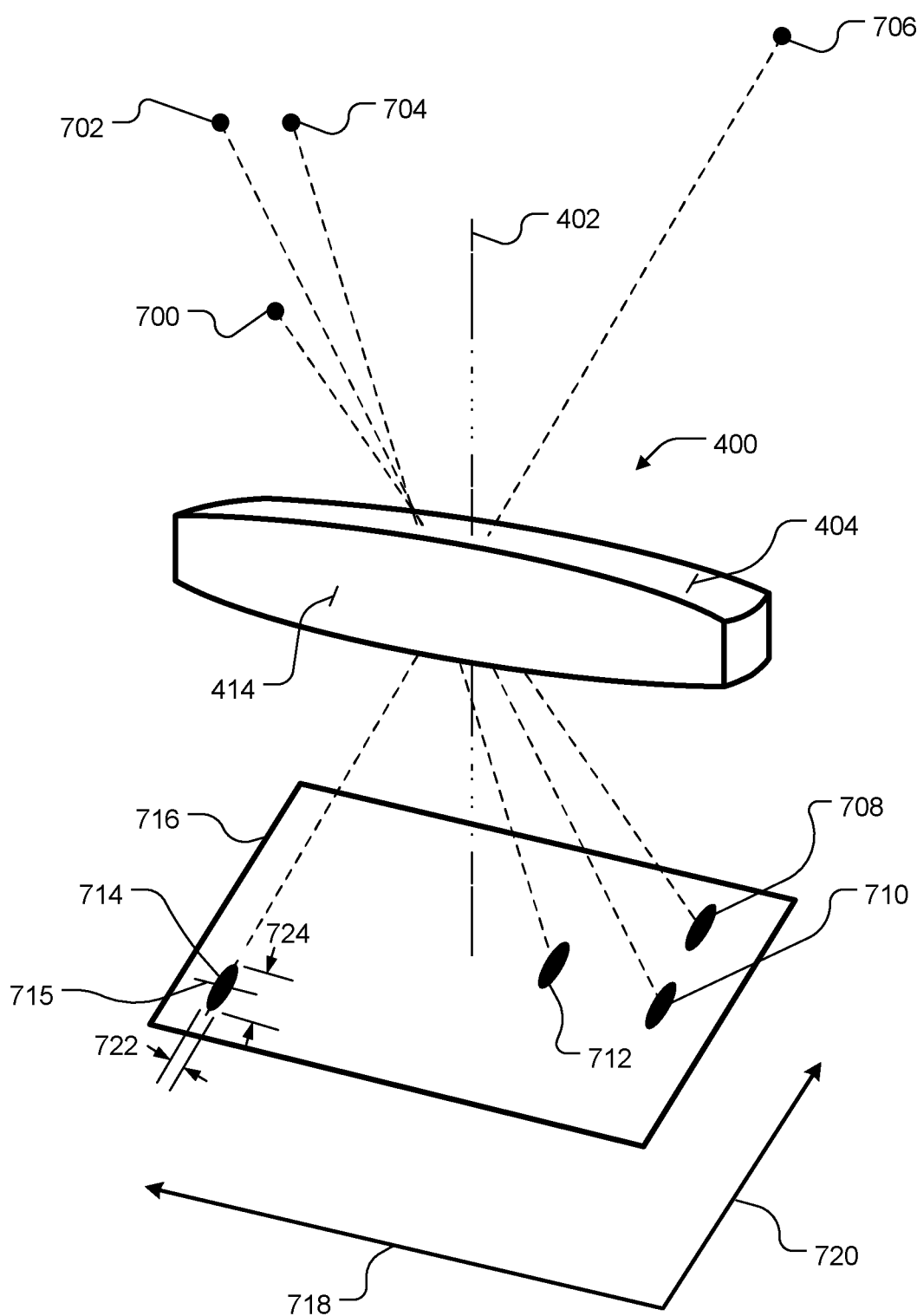
FIG. 7 is a perspective schematic illustration of light rays from celestial objects as the light rays pass through the lens slice of FIGS. 4 and 5 and are then projected onto an image plane, according to an embodiment of the present invention.

FIG. 7 is a perspective schematic illustration showing light rays traced from several point light sources 700, 702, 704 and 706, such as stars in a field of view, through the exemplary lens slice 400, to create respective images 708, 710, 712 and 714 on a focal plane 716. As noted, optical performance along the elongation axis 718 of a lens slice 400 is comparable to that of a conventional lens of equal diameter, such as the conceptual conventional spherical or aspherical lens 600, but optical performance along the width axis 720 of a lens slice 400 can be worse than that of a conventional lens 600. Consequently, the images 708-714 are elongated blobs, rather than circles or points. For example, the length 722 of the image 714 is the same as would be projected by the conceptual conventional spherical or aspherical lens 600. However, the width 724 of the image 714 is larger than would be projected by the conceptual conventional spherical or aspherical lens 600. The same is true for the other images 708-712.

Essentially, the lens slice 400 spreads the images 708-714 in a direction parallel to the width axis 720, compared to the conceptual conventional spherical or aspherical lens 600. Nevertheless, centroids, represented by a crosshair 715, of the images 708-714 are not modified. Consequently, processors, such as those used in star trackers, can use the images 708-714 to ascertain locations of the centroids on an image sensor and, therefore, a location or attitude of a star tracker, as the processors would do with circular or point images, assuming the images 708-714 do not overlap sufficiently to confuse centroid-determining logic in the processors.

Star Tracker

Figure 8:
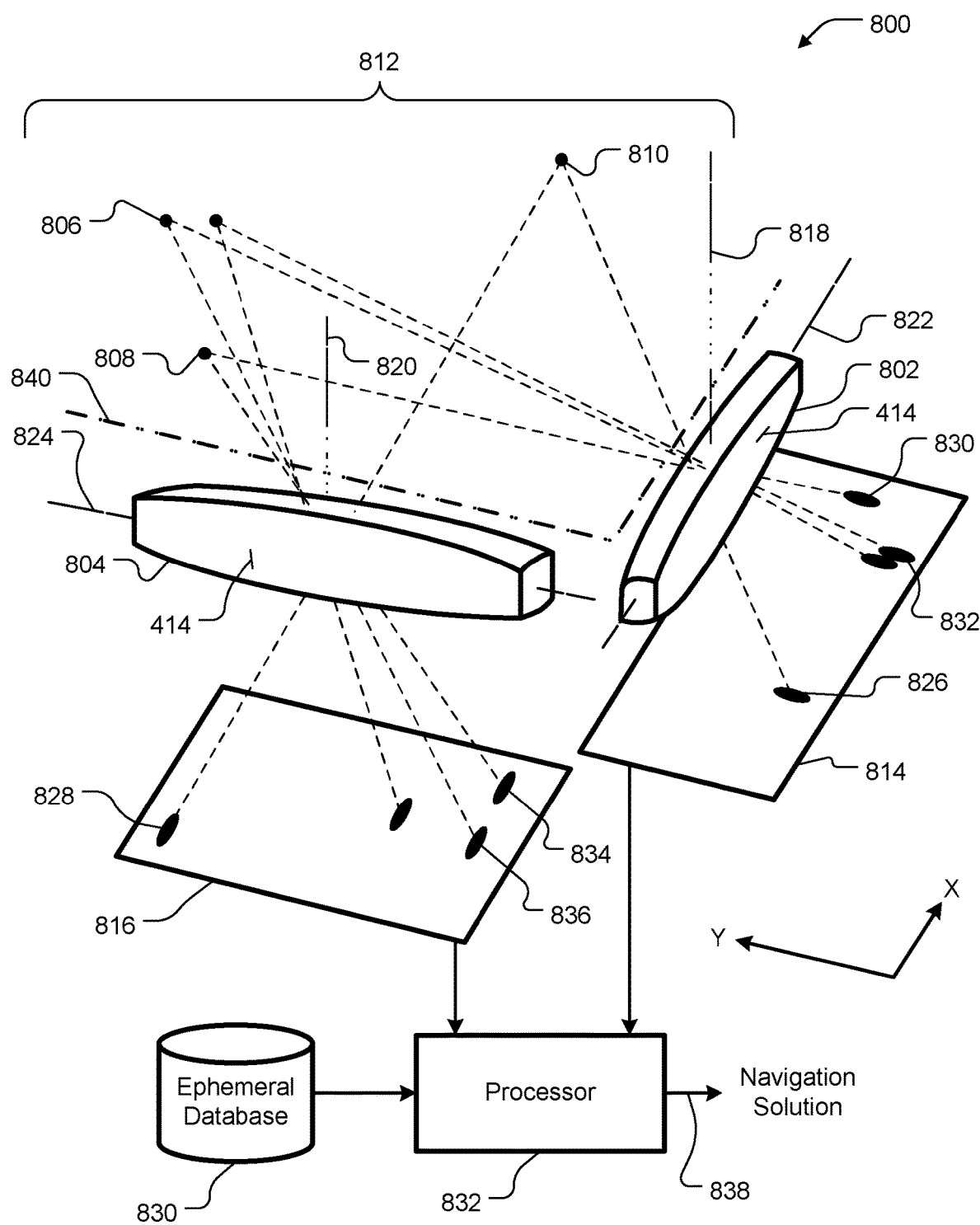
FIG. 8 is a schematic diagram of a star tracker that includes two lens slices as part of a star camera, according to an embodiment of the present invention.

FIG. 8 is a perspective schematic illustration of a star tracker 800 that includes two lens slices 802 and 804 to image celestial objects, exemplified by stars 806, 808 and 810, in a field of view 812 onto respective pixelated image sensors 814 and 816, according to an embodiment of the present invention. The lens slices 802 and 804 are disposed between the field of view 812 and the pixelated image sensors 814 and 816. Centers of each lens slice 802 and 804 may be disposed distances from the respective image sensor 814 and 816 equal to respective focal lengths of the lens slice 802 and 804. The two focal lengths may, but need not, be equal. The lens slices 802 and 804 and the pixelated image sensors 814 and 816 collectively form a star camera. Of course, the two image sensors 814 and 816 may be replaced by a single large image sensor (not shown) or more than two small image sensors (not shown).

Each lens slice 802 and 804 has a respective optical axis 818 and 820 and a respective longitudinal (elongation) axis 822 and 824. Each lens slide 802 and 804 is elongated along its respective elongation axis 822 or 824. The lens slices 802 and 804 are disposed such that the optical axes 818 and 820 are spaced apart from each other, and the longitudinal axes 822 and 824 are perpendicular to each other. Consequently, the two lens slices 802 and 804 spread their respective image blobs in orthogonal directions.

Each lens slice 802 and 804 projects respective images of the celestial objects 806-810 onto its respective pixelated image sensor 814 and 816. For example, celestial object 810 is projected by lens slice 802 onto pixelated image sensor 814 as image 826, and the same celestial object 810 is projected by the other lens slice 804 onto the other pixelated image sensor 816 as image 828. Thus, even if images of more than one celestial object 806-810 overlap on one of the two pixelated image sensors 814 or 816, the images of these celestial objects are not likely to overlap on the other one of the pixelated image sensors 814 or 816.

A database 830 stores ephemeral data, such as a star catalog containing information about a plurality of celestial objects, such as some or all of the celestial objects 806-810. A processor 832 is coupled to the pixelated image sensors 814 and 816. The processor 832 is configured to automatically estimate an attitude of the star tracker 800, an orientation of the star tracker 800 and/or a location of the star tracker 800. The processor 832 performs the estimation based on data in the database 830 and image, location, separation or angle data from the pixelated image sensors 814 and 816. The data from the image sensors 814 and 816 is generated as a result of one or more images, for example image 826, of at least one celestial object, for example star 810, in the field of view 812 being projected onto the pixelated image sensor 814 or 816 by the lens slice 802 or 804.

The data from the pixelated image sensors 814 and 816 may be compressed or uncompressed. The image data may include pixel value (brightness) data, or binary data simply indicating whether a given pixel receives more than a predetermined threshold amount of light, i.e., with respect to pixels on which images 826-836 of the celestial objects 806-810 are projected. Location data from the image sensors 814 and 816 may include pixel number or pixel coordinate information about pixels that receive more than a predetermined threshold amount of light or where a centroid is detected. Separation data from the image sensors 814 and 816 may include numbers of pixels, or distances in some other unit, between pixels that receive more than a predetermined threshold amount of light or where centroids are detected. Angle data from the image sensors 814 and 816 may include angles, taking into account focal length of the lens 802 or 804, between pairs of the celestial objects 804-810, or their centroids, that are projected onto the image sensors 814 and 816.

The estimate from the processor 832 may be referred to as a navigation solution 838. The processor 832 may be configured to perform the functions described herein by executing instructions stored in a memory (not shown). As used herein, including in the claims, the term estimate (as a verb) means to estimate or to calculate.

In a conventional star tracker, x-y positions of celestial object images on a single pixelated image sensor are used to ascertain positions of the celestial objects, angles between pairs of celestial objects or the like. Because the lens slices 802 and 804 are orthogonal, each pixelated image sensor 814 and 816 essentially provides position information along a respective orthogonal axis, as suggested by axes X and Y. The processor 832 may use the x position of a centroid of a given image, for example image 826, on one image sensor 814, and the processor 832 may use the y position of the centroid of the corresponding image 828, i.e., the image cast by the same celestial object 810, on the other image sensor 816. Optionally, the processor 832 may obtain the x and y coordinates of the centroids of both images 826 and 828 from both image sensors 814 and 816, and the processor 832 may estimate an improved x and y coordinates from the coordinates of the two centroids, such as by averaging. In calculating the average, the processor 832 may weight the x and y coordinates from the two image sensors 814 and 816 differently, based on which image sensor 814 or 816 experiences less image spread by the respective lens slice 802 or 804. For example, the image 826 is spread less in the X direction on the image sensor 814 than on the image sensor 816. Thus, the processor may weight the x coordinate of the centroid of the image 826 from the sensor 814 more heavily than the x coordinate of the centroid of the image 828 from the sensor 816.

Thus, using two orthogonally, or otherwise differently, oriented lens slices 802 and 804 compensates for the elongation of each image blob and possible consequential loss of resolution or introduction of beam spread or ambiguity due to blob overlap. Thus, the star tracker 800 should perform at least as well as a comparable conventional star tracker, yet the star tracker 800 is smaller and less massive than a comparable conventional star tracker, because the lens slices 802 and 804 collectively are less voluminous and less massive than a conventional lens in the conventional star tracker. As noted, the lens of a conventional star tracker typically constitutes a large fraction of the mass and volume of the star tracker. Thus, the savings in volume and mass described herein can be considerable.

The two lens slices 802 and 804 in FIG. 8 form an L shape 840. The lens slices 802 and 804 project light onto the two image sensors 814 and 816. At least some of the projected light may travel between the lens slices 802 and 804 and the image sensors 814 and 816 through a volume bounded on two sides by the L shape 840. However, other volume bounded by the L shape 840 is available to house electronics, such as the processor 832, memory storing the database 830, a power supply (not shown), etc.

Figure 9:
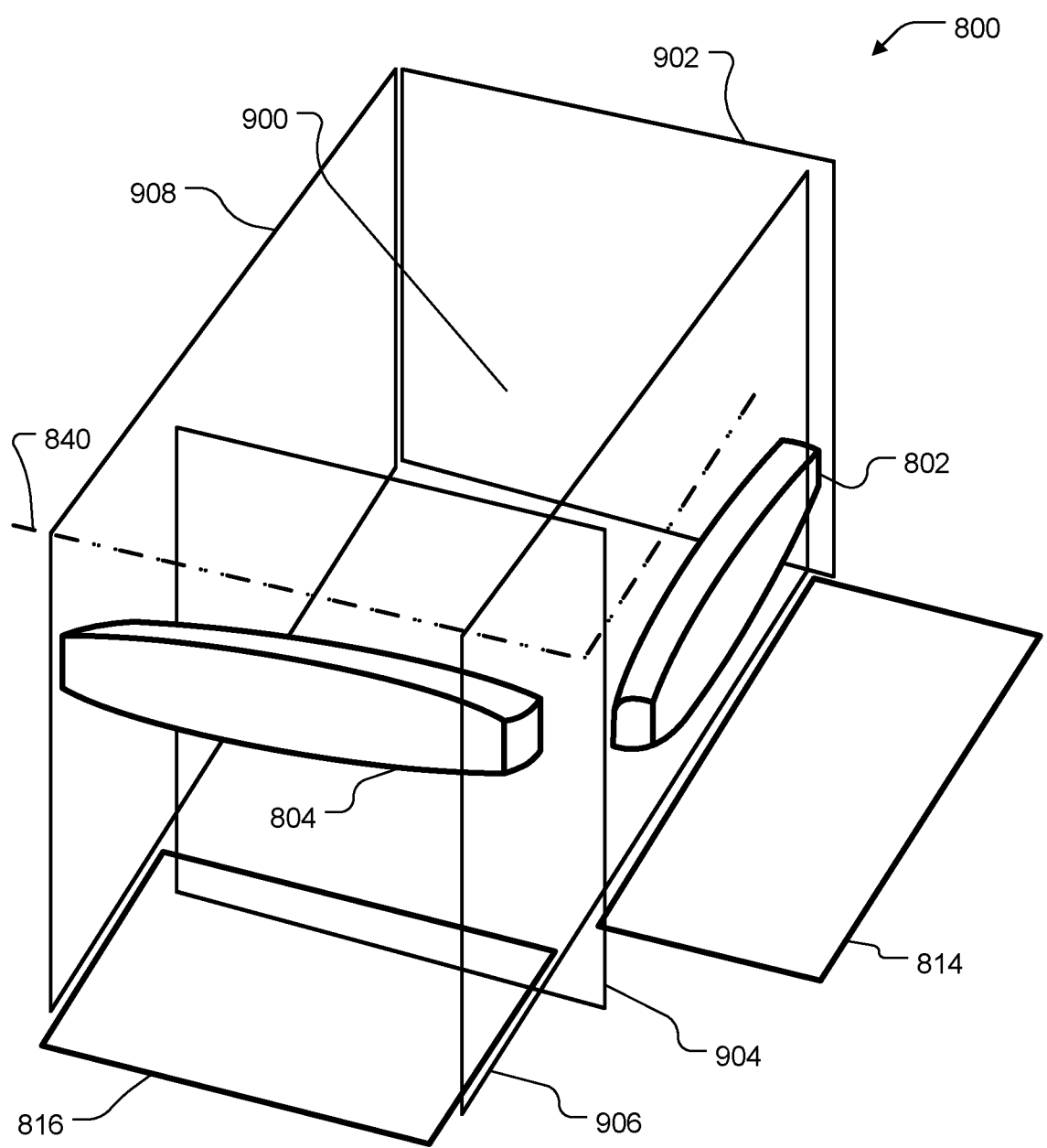
FIG. 9 is a perspective schematic illustration of the star tracker of FIG. 8 showing a volume bounded by two sides of an L shape formed by the two lens slices. Electronics, such as a processor and memory, may be disposed within the volume, according to an embodiment of the present invention.

FIG. 9 is a perspective schematic illustration of the star tracker 800 of FIG. 8 showing the volume 900 bounded by the two sides of the L shape 840. The volume 900 may be bounded on a first side by a first imaginary plane 902 that intersects one end of the first lens slice 802 and extends perpendicular to the pixelated image sensors 814 and 816. The volume 900 may be bounded on a second side by a second imaginary plane 904 that intersects the other end of the first lens slice 802 and extends perpendicular to the pixelated image sensors 814 and 816. The volume 900 may be bounded on a third side by a third imaginary plane 906 that intersects one end of the second lens slice 804 and extends perpendicular to the pixelated image sensors 814 and 816. The volume may be bounded on a fourth side by a fourth imaginary plane 908 that intersects the other end of the second lens slice 804 and extends perpendicular to the pixelated image sensors 814 and 816. As noted, the processor 832, the memory storing the database 830 and other electronics may be disposed within the volume 900, thereby making a compact star tracker 800.

Other Lens Slice Shapes

Figure 10:
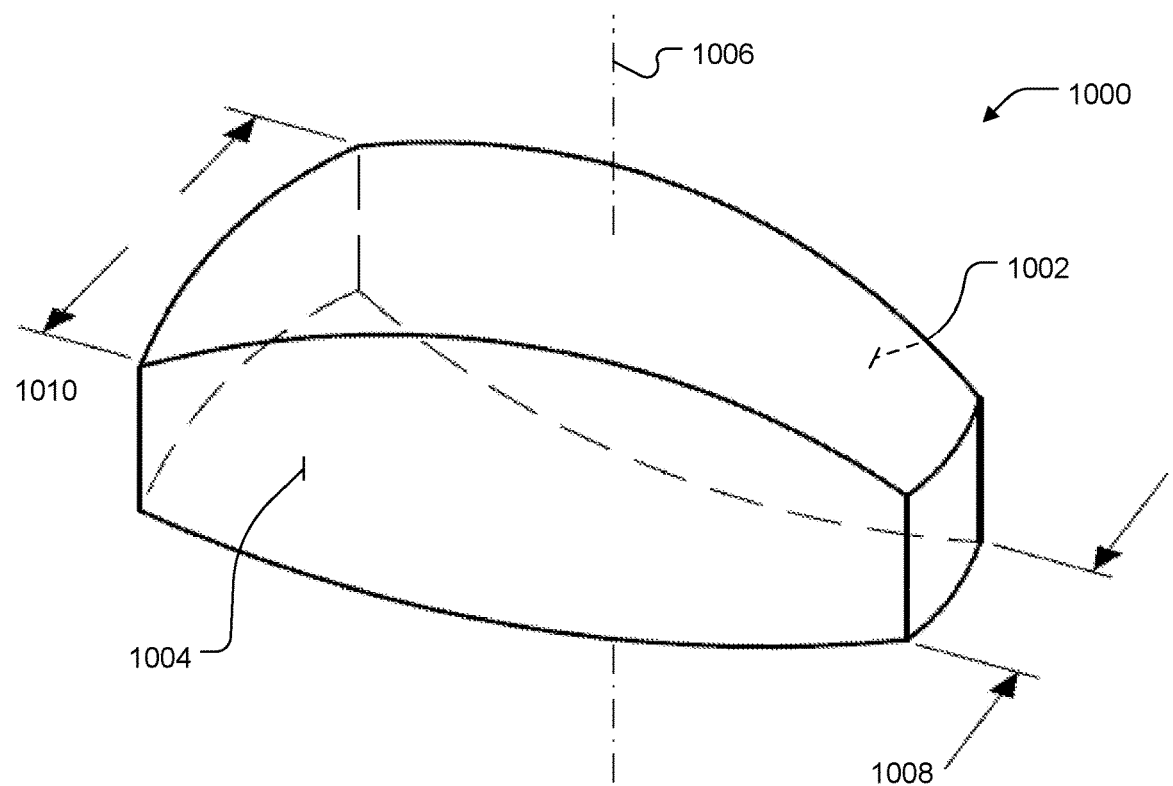
FIGS. 10, 11, 12, 13 and 14 are respective perspective schematic illustrations of various exemplary lens slice shapes, according to respective other embodiments of the present invention.

In the lens slices 400, 802 and 804 shown in FIGS. 4-6, 8 and 9, left and right sides 414 and 504, respectively, (best seen in FIGS. 4 and 5) of the lens slices are parallel to each other and to the optical axes 402, 818 and 820. However, the left and right sides of a lens slice need not be parallel to each other or to the optical axis of the lens slice. FIG. 10 is a perspective view of a lens slice 1000 having left and right sides 1002 and 1004, respectively, that are parallel to the optical axis 1006, according to an embodiment of the present invention. However, the left and right sides 1002 and 1004 are not parallel to each other. As a result of the left and right sides 1002 and 1004 being not parallel to each other, lengths 1008 and 1010 are not equal to each other.

Figure 11:
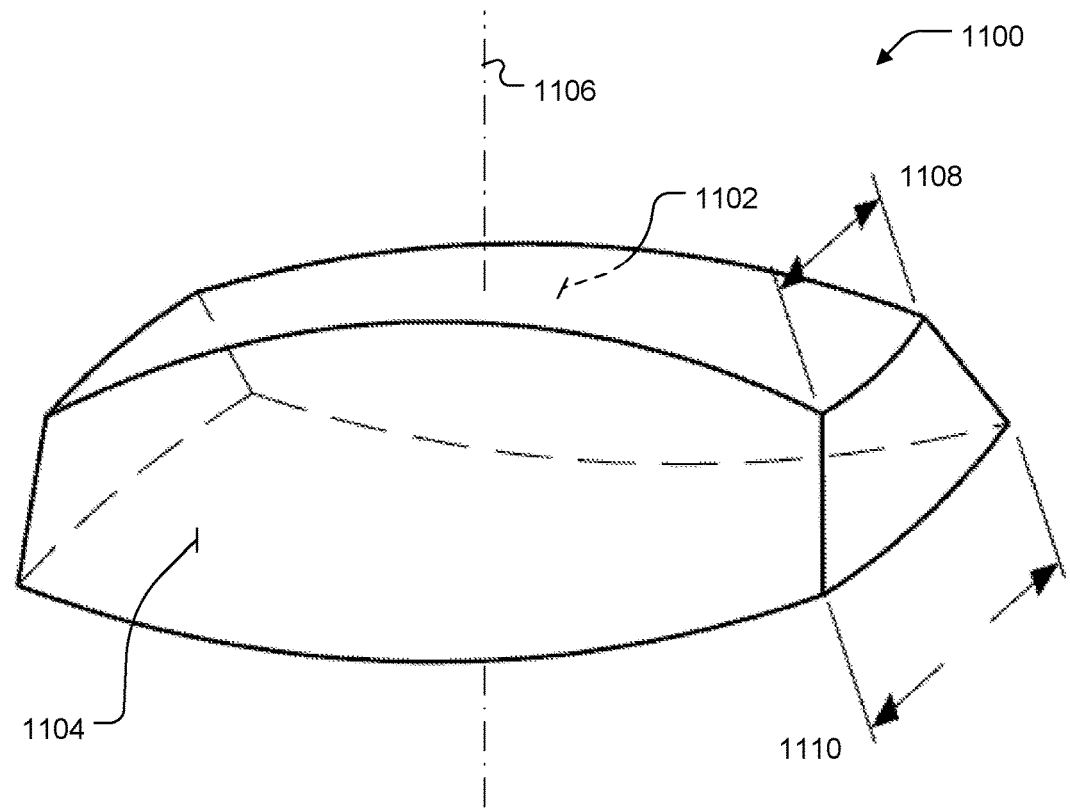

FIG. 11 is a perspective schematic illustration of a lens slice 1100 having left and right sides 1102 and 1104, respectively, that are not parallel to the optical axis 1106 and not parallel to each other, according to another embodiment of the present invention. As a result of the left and right sides 1102 and 1104 being not parallel to the optical axis 1106, lengths 1108 and 1110 are not equal to each other.

Each surface of each lens slice 802 and 804 shown in FIGS. 8 and 9 may have a simple curvature surface or a compound curvature surface. Each lens slice 802 and 804 shown in FIGS. 8 and 9 may be a cylindrical or an acylindrical lens. In the case of simple curvature surfaces, such as cylindrical or acylindrical lenses, the image blobs, such as image blobs 826 and 828, may be lines, possible lines that extend the full width of the respective image sensor 814 or 816. Nevertheless, the combination of two orthogonally, or otherwise differently, oriented lens slices 802 and 804 enable the processor 832 to disambiguate images that overlap on only one of the two image sensors 814 or 816. For example, if images 834 and 836 overlap on image sensor 816, but images 830 and 832 from the corresponding stars 808 and 806, respectively, do not overlap on the other image sensor 814, the processor 832 can measure the x coordinates of the stars 808 and 806 using the image sensor 814. If the two images overlap indistinguishably on the other image sensor 816, the y coordinate of the two images may be treated as equal to each other.

Figure 12:
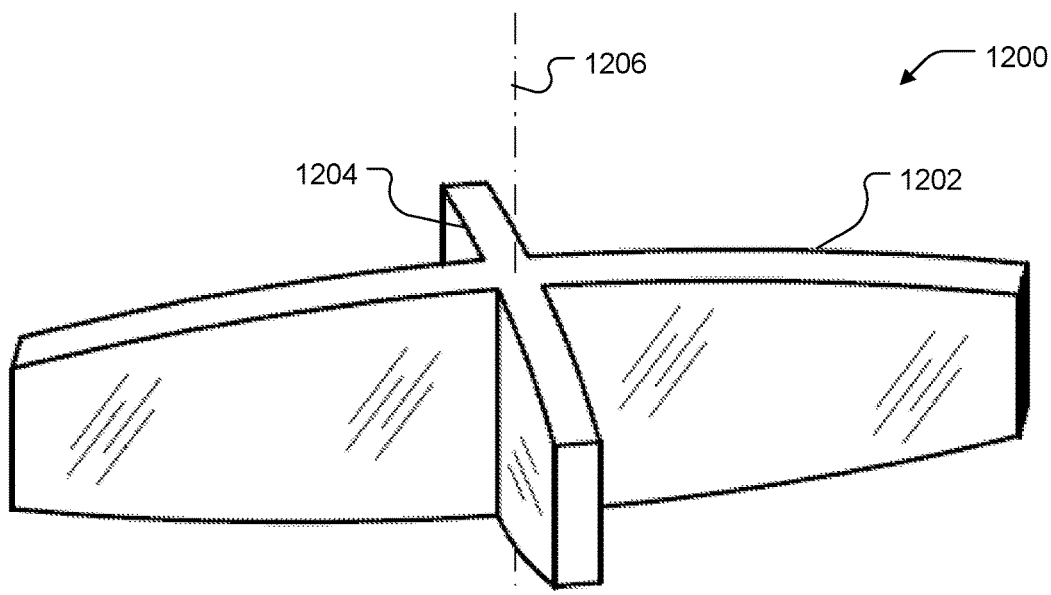

FIG. 12 is a perspective schematic illustration of a lens slice 1200, similar to the lens slices 400, 802 and 804 shown in FIGS. 4-6, 8 and 9. However, the lens slice 1200 includes two elongated portions 1202 and 1204 that intersect at the optical axis 1206 and are mutually orthogonal, thereby forming a cross-shaped lens slice. The cross-shaped lens slice 1200 may have simple curvature surfaces or compound curvature surfaces. The surfaces may be, for example, spherical or aspherical surfaces.

Figure 13:
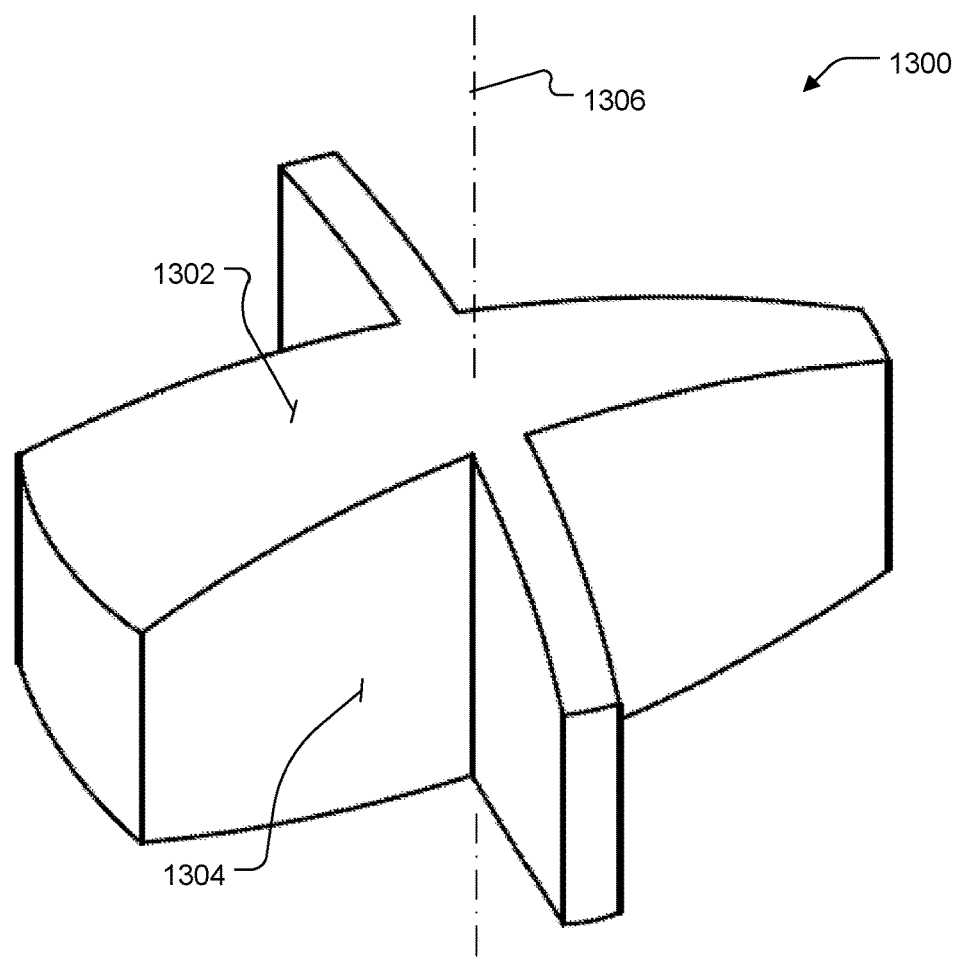

FIG. 13 is a perspective view of a cross-shaped lens slice 1300, similar to the lens slice 1200, except with non-parallel left and right sides 1302 and 1304, as described with respect to the lens slice 1000 shown in FIG. 10. The cross-shaped lens slice 1300 has an optical axis 1306 and may have simple curvature surfaces or compound curvature surfaces. The surfaces may be, for example, spherical or aspherical surfaces.

Figure 14:
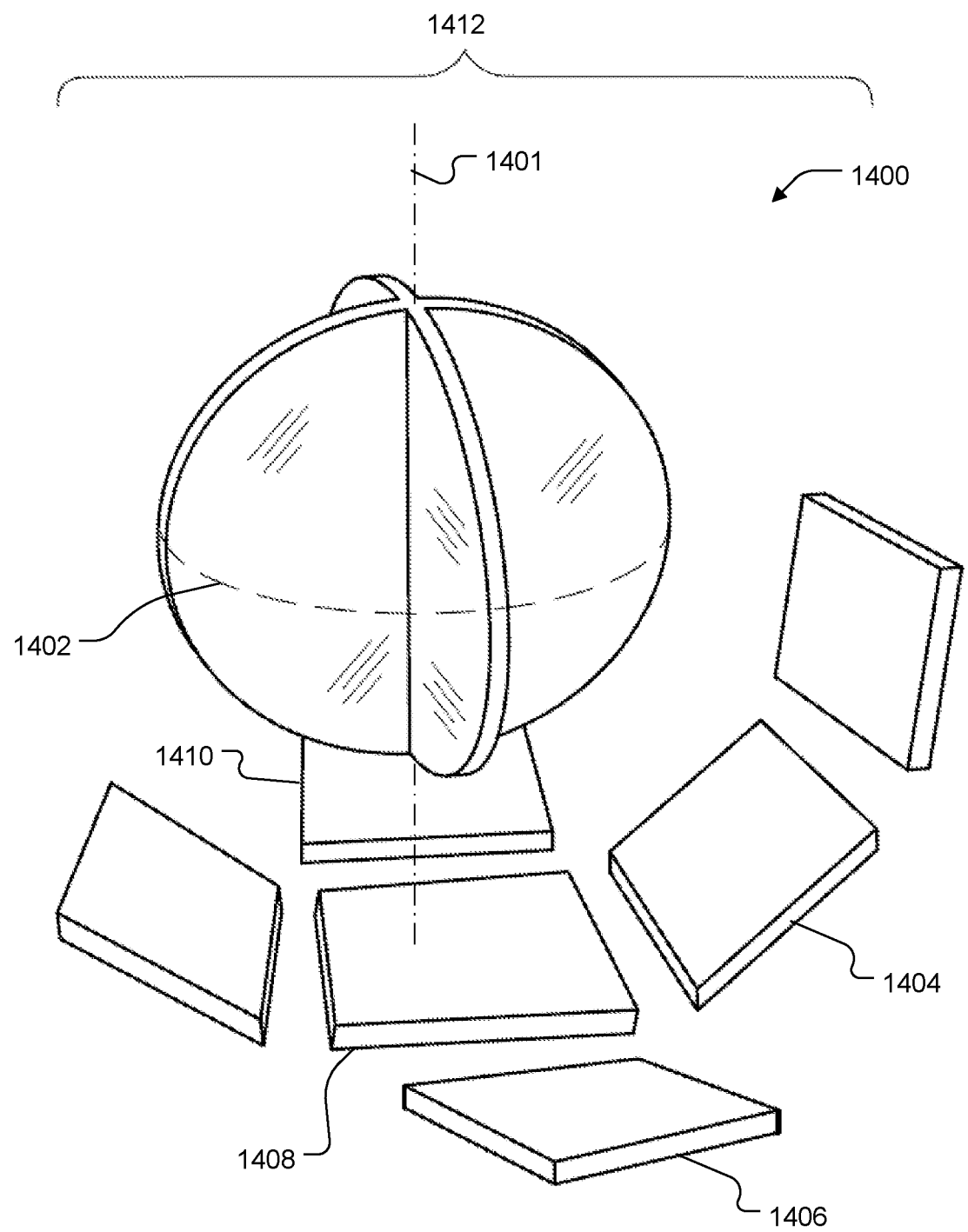

FIG. 14 is a perspective schematic illustration of another cross-shaped lens slice 1400. The lens slice 1400 has an optical axis 1401. As suggested by dashed equator line 1402, the lens slice 1400 is conceptually a slice of a monocentric lens ("ball lens"). Being a monocentric lens slice 1400, the lens provides a wide field of view. Some embodiments of monocentric lens slices have fields of view on the order of about 180°. To capture the wide field of view, or a portion thereof, several image sensor arrays, exemplified by image sensor arrays 1404, 1406, 1408 and 1410, may be disposed on the opposite side of the lens slice 1400 from the field of view 1412. Each image sensor array 1404-1410 may be disposed a distance from the center of the lens slice 1400 equal to the focal length of the lens slice 1400. Optionally, the lens slice 1400 may be optically coupled to the image sensor arrays 1404-1410 by respective bundles of optical fibers (not shown). The lens slice 1400 and the image sensor arrays 1404-1410 may replace the two lens slices 802 and 804 and the two image sensors 814 and 816 in the star tracker 800 (FIG. 8), such as to produce a wide-field-of-view star tracker.

Figure 4:
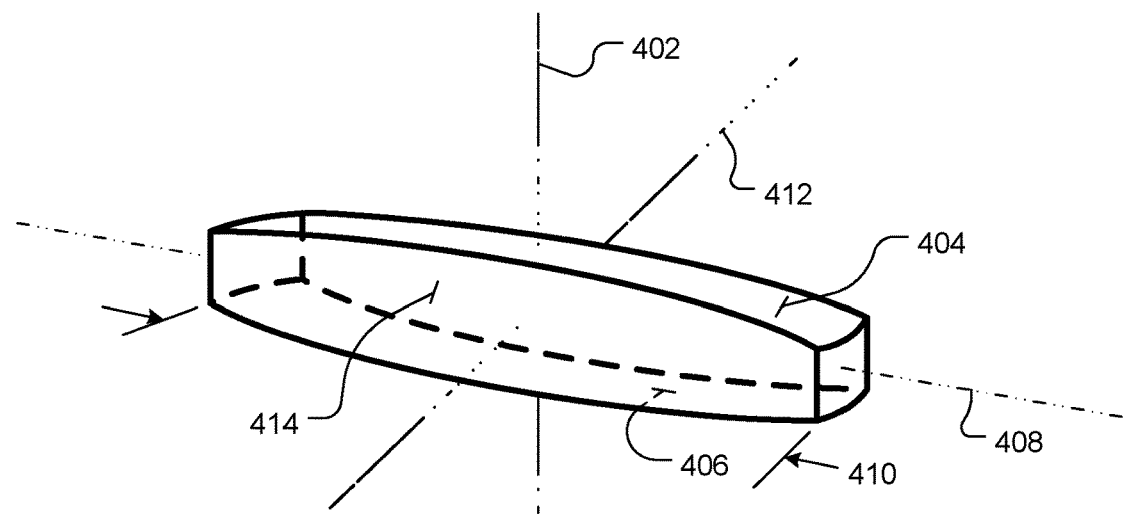
FIGS. 4 and 5 are respective perspective and top schematic illustrations of an exemplary lens slice, according to an embodiment of the present invention.

Functionally, the lens slice 1400 acts as two of the lens slices 400 described with respect to FIGS. 4, 5 and 7, where the two lens slices have a common optical axis and the two lens slices are arranged such that their elongation axes 408 are perpendicular to each other and to the common optical axis. The cross-shaped monocentric lens slice 1400 produces cross-shaped blob images of point light sources. However, centers of the cross-shaped images are bright, relative to arms of the cross-shape, which facilitates finding centroids of the images.

Lens Slice Parameters (Angular Resolution, Numeric Aperture)

One important characteristic of any lens is its angular resolution, i.e., the smallest angle between two distinguishable points imaged by the lens. The angular resolution can be calculated according to well-known equation (1), $$\theta = 1.22 \frac{\lambda}{D} \tag{1}$$

where:

θ is the angular resolution,

λ is the wavelength of light and

D is the diameter of the lens aperture.

Thus, other things being equal, a large diameter lens or aperture (i.e., a small numerical aperture value) provides better (smaller) angular resolution than a small diameter lens or aperture.

As noted, optical performance along the elongation axis of a lens slice is comparable to that of a conventional lens of equal diameter, but optical performance along the width axis of a lens slice can be worse than that of a conventional lens. Consequently, in an optical system that includes a lens slice, the lens slice should be oriented such that the elongation axis, for example the long dimension 500 (FIG. 5), aligns with an axis along which the greatest angular resolution is required. Once the required angular resolution of a lens slice is determined, the long dimension 500 may be calculated, using equation (1). After the long dimension 500 is determined, the orthogonal dimension 502 may be determined, based on the size (area) of the lens or aperture required to admit the amount of light needed.

Making Lens Slices

As noted, in some embodiments, a lens slice 400 (FIGS. 4, 5 and 6) includes only a portion 606 of the conceptual lens 600 remaining after the conceptual lens 600 has been partitioned (cut) through lines 602 and 604. Lens slices can, but need not, be manufactured by conventional machining processes. For example, material may be cut to remove the material from conventional circular lenses, as suggested in FIG. 6. Alternatively, lens slices may, for example, be manufactured by casting or injection molding suitable transparent material in desired shapes, such as shapes similar to the lens slice 400 of FIGS. 4 and 5, or other shapes, examples of which are described herein, such as with respect to FIGS. 10-14. Injection molding may be appropriate for relatively small lens slices.

Figure 15:
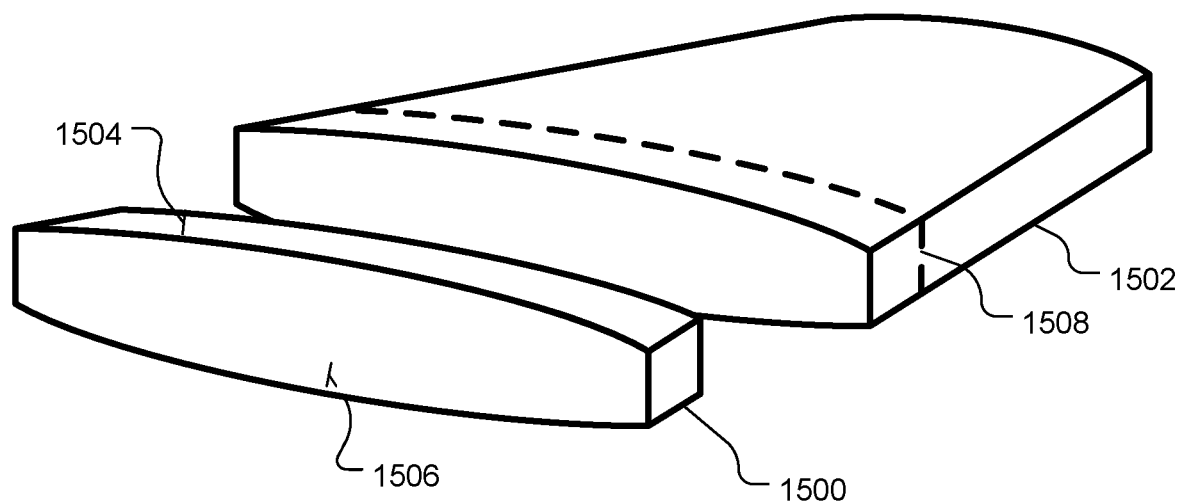
FIGS. 15 and 16 are perspective schematic illustrations of steps involved in making a lens slice, according to an embodiment of the present invention.
Figure 16:
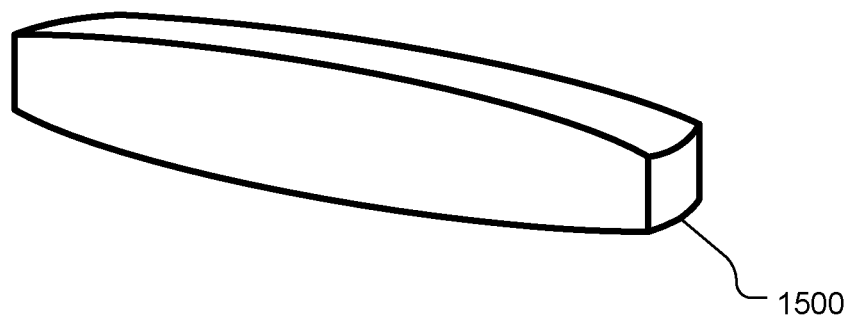

For relatively large lens slices, as schematically illustrated in FIG. 15, the lens slices may be made by cutting pieces, exemplified by piece 1500, from a cylindrical or acylindrical lens 1502. The cylindrical or acylindrical lens 1502 may be made by conventional techniques to have the desired or nearly desired final simple curvature profile(s) of the lens slice. Optionally, after the piece 1500 has been cut from the cylindrical or acylindrical lens 1502, one or both surfaces 1504 and/or 1506 of the piece 1500 may be ground and/or polished to add a respective second dimension of curvature (to create a compound curved surface), as shown in FIG. 16. Additional pieces may be cut from the cylindrical or acylindrical lens 1502, as suggested by dashed line 1508.

Regardless of manufacturing technique, optical surfaces (faces) of lens slices may be polished to smooth the surfaces and/or to more precisely shape the surfaces. Lens slices used for imaging should have compound curved surfaces. However, lens slices used in situations where only one dimension of measurement is necessary, such as in each of the two star cameras in the star tracker discussed with respect to FIG. 8, may be sufficient with only simple curved surfaces.

Multi-Directional Star Camera-Based Navigation System

Figure 17:
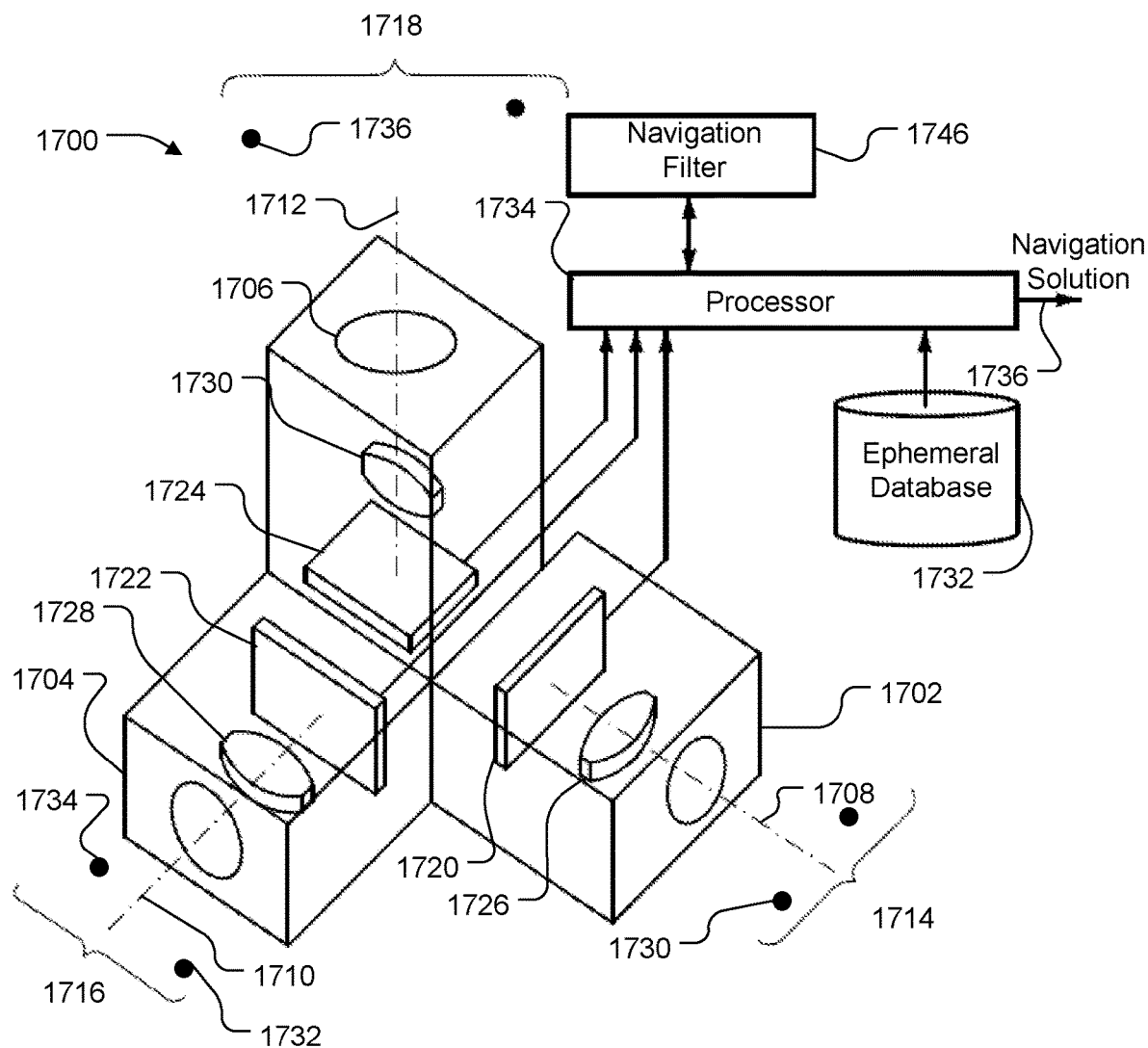
FIG. 17 is a perspective schematic illustration of a navigation system that includes three star cameras, each similar to the star camera of FIG. 8, according to an embodiment of the present invention.

FIG. 17 is a perspective schematic view of a navigation system 1700, according to an embodiment of the present invention. The navigation system 1700 includes three star cameras 1702, 1704 and 1706. Optical axes 1708, 1710 and 1712 of the three star cameras 1702-1706 may be mutually orthogonally, or otherwise differently, oriented. Each star camera 1702-1706 may be constructed as described herein, such as with respect to FIGS. 7-14. Thus, each star camera 1702-1706 has a respective field of view 1714, 1716 and 1718 and a respective pixelated image sensor 1720, 1722 and 1724 and a respective lens slice 1726, 1728 and 1730 disposed between the respective field of view 1714-1718 and the respective pixelated image sensor 1720-1724.

The lens slices 1726-1730 are shown in FIG. 17 as single-elongation-axis lens slices. However, in each star camera 1702-1706, any type of lens slice may be used, including multiple-elongation axes lens slices, such as the lens slices discussed with respect to FIGS. 12-14, as well as groups of differently-oriented lens slices, as discussed with respect to FIGS. 8 and 9. For example, each lens slice 1726-1730 may include a respective first lens slice and a respective second lens slice, analogous to the two lens slices 802 and 804 discussed with respect to FIGS. 8 and 9. Each first lens slice may have a respective first optical axis and a respective first longitudinal axis, analogous to the optical axis 818 and the longitudinal axis 822. Each second lens slice may have a respective second optical axis and a respective second longitudinal axis, analogous to the optical axis 820 and the longitudinal axis 824.

Within each star camera 1702-1706, the respective first optical axis may be spaced apart from the respective second optical axis, and the respective first longitudinal axis may be perpendicular to the respective second longitudinal axis, as discussed with respect to FIG. 8. Each first lens slice may be elongated along the respective first longitudinal axis, and each respective second lens slice may be elongated along the respective second longitudinal axis, as discussed with respect to FIG. 8.

The navigation system 1700 also includes a database 1732 storing ephemeral data about a plurality of celestial objects and a processor 1734 coupled to the pixelated image sensors 1720-1724 and to the database 1732. The processor 1734 is configured to automatically estimate an attitude of the navigation system 1700, an orientation of the navigation system 1700 and/or a location of the navigation system 1700, shown in FIG. 17 as a navigation solution 1736. The processor 1734 is configured to base the estimate on: (a) data from the respective pixelated image sensors 1720-1724 generated as a result of an image of at least one celestial object, such as a star 1730, 1732, 1734 or 1736, in the respective field of view 1714-1718 being projected onto the respective pixelated image sensor 1720-1724 by the respective lens slice 1726-1730 and (b) data in the database 1732.

The processor 1734 may be configured to provide separate estimates of the attitude of the navigation system 1700, the orientation of the navigation system 1700 and/or the location of the navigation system 1700, for each of the three star cameras 1702-1706. The navigation system 1700 may also include a navigation filter 1746. The navigation filter 1746 may be configured to estimate an improved attitude of the navigation system 1700, an improved orientation of the navigation system 1700 and/or an improved location of the navigation system 1700. The navigation filter 1746 may base the improved estimate on the separate estimates of the attitude of the navigation system 1700, orientation of the navigation system 1700 and/or location of the navigation system 1700. The navigation filter 1746 may be implemented by the processor 1734. Alternatively, a separate navigation filter 1746 may be coupled to the processor 1734.

The processor 1734 may be configured to perform the functions described herein by executing instructions stored in a memory (not shown). Similarly, the navigation filter 1746 may be implemented by the processor 1734 or by a separate processor (not shown), and that processor may be configured to perform the functions described herein by executing instructions stored in a memory (not shown).

Compound Lens Slice

Figure 18:
FIGS. 18 and 19 are respective top and perspective schematic illustrations of a compound lens slice, according to an embodiment of the present invention.
Figure 19:
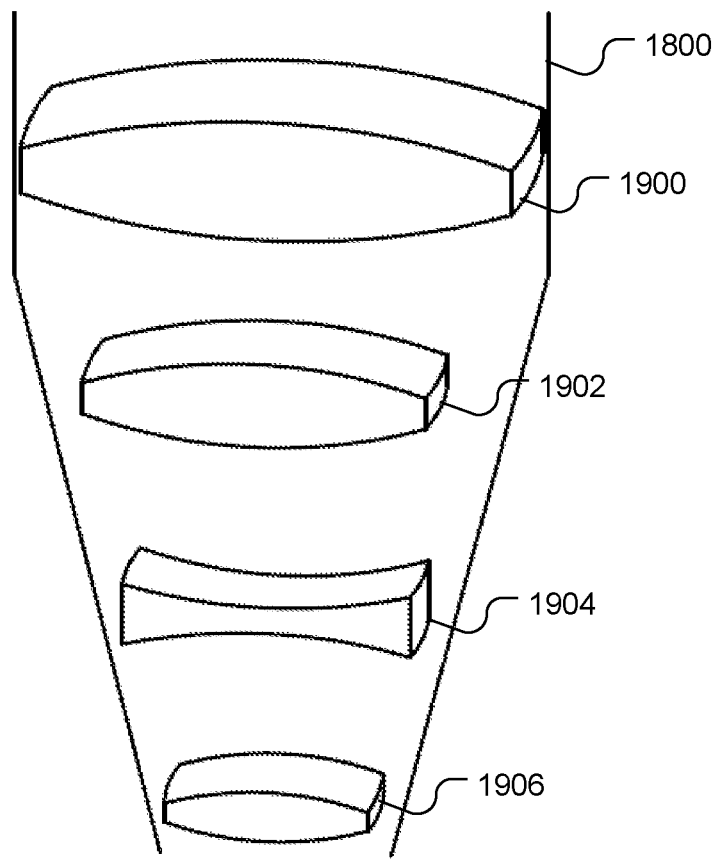

As noted, a simple lens includes a single piece of transparent material, whereas a compound lens includes several adjacent or spaced apart simple lenses (elements), usually arranged along a common axis, and sometimes cemented together. A lens slice can include several such elements, where each element can itself be a lens slice. An exemplary compound lens slice 1800 is shown schematically in top view and in perspective cut-away view in FIGS. 18 and 19, respectively. As shown in FIG. 19, the exemplary compound lens slice 1800 includes four separate elements 1900, 1902, 1904 and 1906. Of course, a compound lens slice may include any number of separate elements.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory and/or accessing data stored in the memory or another memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A star tracker having a field of view, the star tracker comprising:
    a database storing ephemeral data about a plurality of celestial objects;
    a pixelated image sensor;
    a lens slice disposed between the field of view and the pixelated image sensor, wherein the lens slice comprises an elongated diametric portion, less than all, of a conceptual conventional lens along an elongation axis perpendicular to an optical axis of the conceptual conventional lens, and encompassing the optical axis of the conceptual conventional lens, such that optical performance of the lens slice along the elongation axis is comparable to optical performance of the conceptual conventional lens and optical performance of the lens slice along a width axis perpendicular to the elongation axis is worse than the optical performance of the conceptual conventional lens; and
    a processor coupled to the pixelated image sensor and to the database and configured to automatically estimate one or more of: (a) attitude of the star tracker, (b) orientation of the star tracker or (c) location of the star tracker, based on: (a) data from the pixelated image sensor generated as a result of an image of at least one celestial object in the field of view being projected onto the pixelated image sensor by the lens slice and (b) the ephemeral data in the database.

2. A star tracker according to claim 1, wherein the lens slice defines a surface, through which passes light that forms the image of the at least one celestial object in the field of view, the surface being a simple curvature surface.

3. A star tracker according to claim 1, wherein the lens slice defines a surface, through which passes light that forms the image of the at least one celestial object in the field of view, the surface being a compound curvature surface.

4. A star tracker according to claim 3, wherein the lens slice comprises:
    a first lens slice having a first optical axis and a first longitudinal axis; and
    a second lens slice having a second optical axis and a second longitudinal axis;
    wherein the first optical axis is spaced apart from the second optical axis, and the first longitudinal axis is perpendicular to the second longitudinal axis.

5. A star tracker according to claim 4, wherein:
    the first lens slice defines a first surface, through which passes at least some light that forms the image of the at least one celestial object in the field of view, the first surface being a first compound curvature surface; and the second lens slice defines a second surface, through which passes at least some light that forms the image of the at least one celestial object in the field of view passes, the second surface being a second compound curvature surface.

6. A star tracker according to claim 4, wherein:
the first lens slice is elongated along the first longitudinal axis; and
the second lens slice is elongated along the second longitudinal axis.

7. A star tracker according to claim 4, wherein:
the first lens slice has a first focal distance;
the second lens slice has a second focal distance equal to the first focal distance; and
the pixelated image sensor comprises:
  a first pixelated image sensor array disposed the first focal distance from a center of the first lens slice; and
  a second pixelated image sensor array disposed the second focal distance from a center of the second lens slice.

8. A star tracker according to claim 4, wherein the processor is disposed in a volume bounded:
on a first side by a first imaginary plane that intersects one end of the first lens slice and extends perpendicular to the pixelated image sensor;
on a second side by a second imaginary plane that intersects the other end of the first lens slice and extends perpendicular to the pixelated image sensor;
on a third side by a third imaginary plane that intersects one end of the second lens slice and extends perpendicular to the pixelated image sensor; and
on a fourth side by a fourth imaginary plane that intersects the other end of the second lens slice and extends perpendicular to the pixelated image sensor.

9. A star tracker according to claim 1, wherein the lens slice comprises a cross-shaped spherical lens slice.

10. A star tracker according to claim 1, wherein the lens slice comprises a cross-shaped monocentric lens slice.

11. A star tracker according to claim 10, wherein:
the lens slice has a focal length; and
the pixelated image sensor comprises a plurality of image sensor arrays, each image sensor array of the plurality of image sensor arrays being disposed the focal length from a center of the monocentric lens slice.

12. A star tracker according to claim 2, wherein the lens slice comprises:
a first lens slice having a first optical axis and a first longitudinal axis; and
a second lens slice having a second optical axis and a second longitudinal axis;
wherein the first optical axis is spaced apart from the second optical axis, and the first longitudinal axis is perpendicular to the second longitudinal axis.

13. A star tracker according to claim 12, wherein:
the first lens slice comprises a first cylindrical lens; and
the second lens slice comprises a second cylindrical lens.

14. A star tracker according to claim 12, wherein:
the first lens slice defines a first surface, through which passes at least some light that forms the image of the at least one celestial object in the field of view, the first surface being a first simple curvature surface; and
the second lens slice defines a second surface, through which passes at least some light that forms the image of the at least one celestial object in the field of view passes, the second surface being a second simple curvature surface.

15. A star tracker according to claim 5, wherein the pixelated image sensor comprises a plurality of pixels arranged in a two-dimensional pattern.

16. A navigation system, comprising:
a database storing ephemeral data about a plurality of celestial objects;
first, second and third star cameras, wherein each star camera of the first, second and third star cameras has a respective field of view and comprises:
  a respective pixelated image sensor; and
  a respective lens slice disposed between the respective field of view and the respective pixelated image sensor, wherein the respective lens slice comprises an elongated diametric portion, less than all, of a conceptual conventional lens along an elongation axis perpendicular to an optical axis of the conceptual conventional lens, and encompassing the optical axis of the conceptual conventional lens, such that optical performance of the respective lens slice along the elongation axis is comparable to optical performance of the conceptual conventional lens and optical performance of the respective lens slice along a width axis perpendicular to the elongation axis is worse than the optical performance of the conceptual conventional lens; and
a processor coupled to the pixelated image sensor of each of the first, second and third star cameras and to the database and configured to automatically estimate one or more of: (a) attitude of the navigation system, (b) orientation of the navigation system or (c) location of the navigation system, based on: (a) data from the respective pixelated image sensors of the first, second and third star cameras generated as a result of an image of at least one celestial object in the field of view of one or more of: the first, second and third star cameras being projected onto the respective pixelated image sensor by the respective lens slice or (b) the ephemeral data in the database.

17. A navigation system according to claim 16, wherein each respective lens slice defines a surface, through which passes light that forms the image of the at least one celestial object in the field of view, the surface being a compound curvature surface.

18. A navigation system according to claim 17, wherein each star camera of the first, second and third star cameras has a respective optical axis, and the optical axes of the first, second and third star cameras are mutually orthogonal.

19. A navigation system according to claim 17, wherein, for each star camera of the first, second and third star cameras, the respective lens slice comprises:
a respective first lens slice having a respective first optical axis and a respective first longitudinal axis; and
a respective second lens slice having a respective second optical axis and a respective second longitudinal axis;
wherein the respective first optical axis is spaced apart from the respective second optical axis, and the respective first longitudinal axis is perpendicular to the respective second longitudinal axis.

20. A navigation system according to claim 19, wherein, for each star camera of the first, second and third star cameras:
the respective first lens slice is elongated along the respective first longitudinal axis; and the respective second lens slice is elongated along the respective second longitudinal axis.

21. A navigation system according to claim 19, wherein:

the processor is configured to provide separate estimates of the one or more of the: (a) attitude of the navigation system, (b) orientation of the navigation system or (c) location of the navigation system, for each of the first, second and third star cameras; and the navigation system further comprises:

a navigation filter configured to estimate, based on the separate estimates of the one or more of the: (a) attitude of the navigation system, (b) orientation of the navigation system or (c) location of the navigation system, an improved one or more of: (a) attitude of the navigation system, (b) orientation of the navigation system or (c) location of the navigation system.

\* \* \* \* \*